United States Patent
Corem et al.

(10) Patent No.: US 8,509,733 B2
(45) Date of Patent: Aug. 13, 2013

(54) SYSTEM AND METHOD FOR DETERMINING COMMONLY USED COMMUNICATION TERMINALS AND FOR IDENTIFYING NOISY ENTITIES IN LARGE-SCALE LINK ANALYSIS

(75) Inventors: Yochai Corem, Hertzelia (IL); Muli Segal, Tel Aviv (IL); Eithan Goldfarb, Ness Ziona (IL)

(73) Assignee: Verint Americas, Inc., Alpharetta, GA (US)

( * ) Notice: Subject to any disclaimer, the term of this patent is extended or adjusted under 35 U.S.C. 154(b) by 72 days.

(21) Appl. No.: 13/096,145

(22) Filed: Apr. 28, 2011

(65) Prior Publication Data

US 2011/0319052 A1    Dec. 29, 2011

(30) Foreign Application Priority Data

Apr. 28, 2010 (IL) .......................................... 205395
Apr. 28, 2010 (IL) .......................................... 205396

(51) Int. Cl.
*H04M 11/00* (2006.01)

(52) U.S. Cl.
USPC ..................... 455/405; 455/404.2; 455/435.1; 455/436

(58) Field of Classification Search
USPC ............................ 455/405, 404.2, 435.1, 436
See application file for complete search history.

(56) References Cited

U.S. PATENT DOCUMENTS

| | | | |
|---|---|---|---|
| 5,689,442 A | 11/1997 | Swanson et al. | |
| 6,262,974 B1 * | 7/2001 | Chevalier et al. | 370/232 |
| 6,404,857 B1 | 6/2002 | Blair et al. | |
| 6,507,562 B1 * | 1/2003 | Kadansky et al. | 370/216 |
| 6,718,023 B1 | 4/2004 | Zolotov | |
| 6,735,436 B1 | 5/2004 | McCauley et al. | |
| 6,757,361 B2 | 6/2004 | Blair et al. | |
| 6,996,056 B2 | 2/2006 | Chheda et al. | |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 7,822,660 B1 | 10/2010 | Donoho et al. | |
| 2004/0002348 A1 | 1/2004 | Fraccaroli | |
| 2004/0058700 A1 * | 3/2004 | Nilsson et al. | 455/522 |

(Continued)

FOREIGN PATENT DOCUMENTS

| | | |
|---|---|---|
| EP | 2169568 A1 | 3/2010 |
| WO | 2010116292 A2 | 10/2010 |

OTHER PUBLICATIONS

U.S. Official Action dated Apr. 26, 2012 in U.S. Appl. No. 13/244,462.

(Continued)

*Primary Examiner* — Jean Gelin
*Assistant Examiner* — Qun Shen
(74) *Attorney, Agent, or Firm* — Meunier Carlin & Curfman

(57) ABSTRACT

Systems and methods for identifying and characterizing relationships based on communication traffic. The methods may include accepting indications of communication conducted among entities over a communication network, and using a link processor, analyzing the indications so as to identify that two or more of the entities are interrelated by detecting one or more intermediate entities with which the two or more entities communicate. A criterion may be evaluated with respect to the indications associated with a given entity, responsively to meeting the criterion, disqualifying the given entity from serving as an intermediate entity in analyzing the indications.

16 Claims, 7 Drawing Sheets

(56) References Cited

U.S. PATENT DOCUMENTS

| | | | |
|---|---|---|---|
| 2004/0185884 A1 | 9/2004 | Marin et al. | |
| 2005/0149443 A1 | 7/2005 | Torvinen | |
| 2006/0030333 A1 | 2/2006 | Ward et al. | |
| 2006/0173957 A1* | 8/2006 | Robinson et al. | 709/204 |
| 2007/0008927 A1* | 1/2007 | Herz et al. | 370/331 |
| 2007/0019643 A1 | 1/2007 | Shaheen | |
| 2007/0156766 A1 | 7/2007 | Hoang et al. | |
| 2007/0287412 A1* | 12/2007 | Ge et al. | 455/404.2 |
| 2008/0014873 A1 | 1/2008 | Krayer et al. | |
| 2008/0261192 A1 | 10/2008 | Huang et al. | |
| 2008/0285464 A1* | 11/2008 | Katzir | 370/241 |
| 2009/0029684 A1* | 1/2009 | Rosenblatt et al. | 455/414.1 |
| 2009/0059795 A1* | 3/2009 | Fonseca et al. | 370/236 |
| 2009/0083852 A1* | 3/2009 | Kuo et al. | 726/22 |
| 2009/0204693 A1* | 8/2009 | Andreev et al. | 709/221 |
| 2010/0145947 A1* | 6/2010 | Kolman et al. | 707/736 |

OTHER PUBLICATIONS

Extended European search report, dated Jan. 23, 2012, received from the European Patent Office in connection with corresponding European patent application No. 11164020.7.

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fox Replay BV, "FoxReplay Analyst," http//www.foxreplay.com, Revision 1.0, Nov. 2007, 5 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Meyer, Ulrike, et al., "On the Impact of GSM Encryption and Man-in-the-Middle Attacks on the Security of Interoperating GSM/UMTS Networks," IEEE, 2004, 8 pages.

Notice of Allowance, dated Sep. 21, 2012, in related U.S. Appl. No. 13/244,462.

* cited by examiner

| LUR-RECORD PARAMETERS | | | |
|---|---|---|---|
| CELL-ID | CURRENT_LAC | TIMESTAMP (DATE/HHMM.SS) | IMSI |
| ⋮ | ⋮ | ⋮ | ⋮ |
| 28683 | 44092 | 100209/1401.10 | XXXYY8934567890 |
| 28683 | 44092 | 100209/1401.00 | XXXYY0145456789 |
| 28683 | 44092 | 100209/1400.30 | XXXYY9012565678 |
| 28683 | 44092 | 100209/1400.10 | XXXYY8901231267 |
| 28683 | 44092 | 100209/1400.01 | XXXYY7890123016 |
| ⋮ | ⋮ | ⋮ | ⋮ |
| 26780 | 46392 | 100209/1400.55 | XXXYY1237867890 |
| 26780 | 46392 | 100209/1400.50 | XXXYY0145456789 |
| 26780 | 46392 | 100209/1400.40 | XXXYY9013445678 |
| 26780 | 46392 | 100209/1400.18 | XXXYY8934567890 |
| 26780 | 46392 | 100209/1400.02 | XXXYY7892223456 |
| ⋮ | ⋮ | ⋮ | ⋮ |
| 18682 | 46290 | 100209/1401.20 | XXXYY1234567890 |
| 18682 | 46290 | 100209/1400.39 | XXXYY7890123016 |
| 18682 | 46290 | 100209/1400.26 | XXXYY8901231267 |
| 18682 | 46290 | 100209/1400.10 | XXXYY8901234567 |
| 18682 | 46290 | 100209/1400.00 | XXXYY7890123456 |
| ⋮ | ⋮ | ⋮ | ⋮ |

FIG. 7

| GEOGRAPHICAL LINKS |||
|---|---|---|
| DATE | LINKED IMSIs | LINK STRENGTH |
| 2010.02.09 | XXXYY8934567890    XXXYY0145456789 | 1 |
| | XXXYY8901231267    XXXYY7890123016 | 2 |
| | XXXYY1237867890    XXXYY9013445678 | 1 |
| | XXXYY8901234567    XXXYY7890123456 | 1 |

FIG. 8

SYSTEM AND METHOD FOR DETERMINING COMMONLY USED COMMUNICATION TERMINALS AND FOR IDENTIFYING NOISY ENTITIES IN LARGE-SCALE LINK ANALYSIS

FIELD OF THE DISCLOSURE

The present disclosure relates generally to cellular communication devices, and specifically to determining common usage of such devices.

BACKGROUND OF THE DISCLOSURE

Cellular networks are typically able to track the locations of mobile communication terminals operating within the network by a variety of means. The means are used, for example, for providing Location Based Services (LBS) and emergency services in the networks. One passive technique determines the location based on the radio signal delay of the closest cell-phone towers. Some techniques are active, i.e., proactively request the network or the terminal to provide location information.

Various techniques for analyzing and extracting useful information from communication traffic are known in the art. Some analysis techniques process communication traffic in order to identify and characterize relationships between users.

The description above is presented as a general overview of related art in this field and should not be construed as an admission that any of the information it contains constitutes prior art against the present patent application.

SUMMARY OF THE DISCLOSURE

An embodiment that is described hereinbelow provides a method, including:

accepting indications of communication conducted among entities over a communication network;

using a link processor, analyzing the indications so as to identify that two or more of the entities are interrelated by detecting one or more intermediate entities with which the two or more entities communicate;

evaluating a criterion with respect to the indications associated with a given entity; and responsively to meeting the criterion, disqualifying the given entity from serving as an intermediate entity in analyzing the indications.

In some embodiments, analyzing the indications includes constructing a data structure that represents relationships among the entities, and disqualifying the given entity includes disregarding the indications associated with the given entity in constructing the data structure. In a disclosed embodiment, disqualifying the given entity includes adding the given entity to a list of disqualified entities, and constructing the data structure includes updating the data structure only in response to the indications associated with the entities that do not belong to the list.

In an embodiment, the criterion depends on a growth rate of a total number of the entities that communicate with the given entity. Evaluating the criterion and disqualifying the given entity may include disqualifying the given entity responsively to assessing that the growth rate exceeds a predefined value. In another embodiment, the criterion depends on a number of the entities with which the given entity communicates in a single session. In yet another embodiment, evaluating the criterion includes determining that the given entity indicates false interrelationships among the entities.

In still another embodiment, evaluating the criterion includes determining that the given entity indicates both false interrelationships and genuine interrelationships among the entities. Determining that the given entity indicates both the false interrelationships and the genuine interrelationships may include identifying that a growth rate of a total number of the entities that communicate with the given entity falls between predefined minimum and maximum values. In some embodiments, the method includes assigning respective scores to the entities that communicate with the given entity, and distinguishing between the false interrelationships and the genuine interrelationships responsively to the scores.

There is additionally provided, in accordance with an embodiment that is described hereinbelow, a system, including:

an interface, which is configured to accept indications of communication conducted among entities over a communication network; and a link processor, which is configured to analyze the indications so as to identify that two or more of the entities are interrelated by detecting one or more intermediate entities with which the two or more entities communicate, to evaluate a criterion with respect to the indications associated with a given entity, and, responsively to meeting the criterion, to disqualify the given entity from serving as an intermediate entity in analyzing the indications.

The present disclosure will be more fully understood from the following detailed description of the embodiments thereof, taken together with the drawings in which:

BRIEF DESCRIPTION OF THE DRAWINGS

FIG. 7 is a schematic table derived from the procedure of FIG. 6, according to an embodiment of the present disclosure; and FIG. 8 is another schematic table derived from the procedure of FIG. 6, according to an embodiment of the present disclosure.

DETAILED DESCRIPTION OF EMBODIMENTS

Overview

Figure 1:
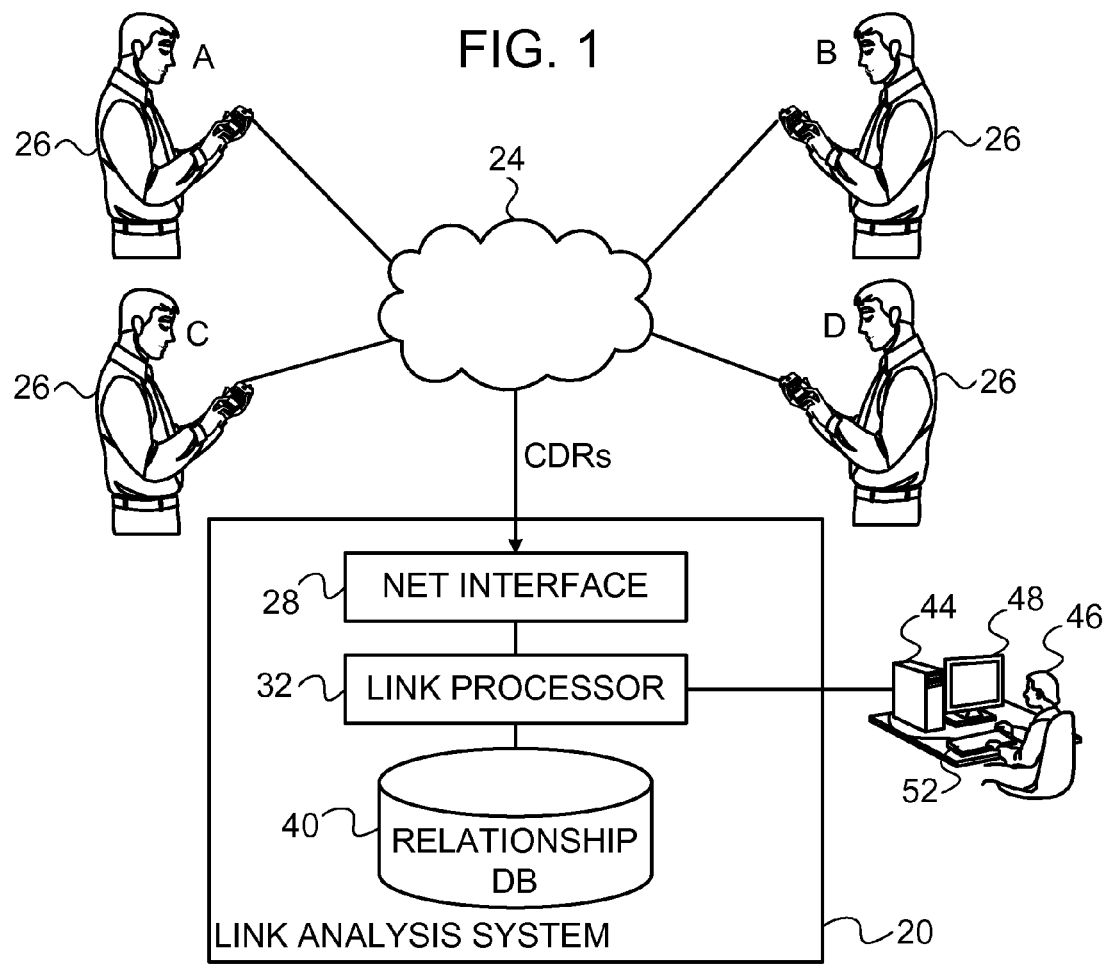
FIG. 1 is a block diagram that schematically illustrates a system for large-scale link analysis, in accordance with an embodiment of the present disclosure.

Some data analytics applications identify relationships among entities (e.g., individuals, groups of individuals or even entire organizations) that communicate over a communication network, and act upon the identified relationships. Relationships can be identified and characterized, for example, by analyzing communication sessions (e.g., phone conversations or e-mail messages) held between the entities.

Embodiments that are described herein provide improved methods and systems for identifying and characterizing relationships based on communication traffic. In some embodiments, a link processor receives indications of communication sessions that are conducted among entities over a communication network. The link processor identifies two or more entities as interrelated by detecting an intermediate entity with which they communicate. This technique is useful in many scenarios in which interrelated entities do not communicate directly with one another.

In some cases, however, two or more entities may communicate with a given entity without necessarily being related to one another. For example, telephone numbers of service providers (e.g., phone directory assistance, airline reservation, technical support and pizza delivery telephone numbers) conduct calls with many entities that are not necessarily interrelated. Unless identified and accounted for, entities of this sort may generate false relationships, i.e., erroneously point out unrelated entities as interrelated. Entities that generate false relationships are referred to herein as noisy entities.

Some entities are regarded as partially-noisy entities, i.e., entities that generate both valid relationships and false relationships. For example, the telephone number of a doctor or plumber may conduct calls with many unrelated clients. On the other hand, the same doctor or plumber may communicate with some entities that are genuinely related to one another, such as colleagues, family members or friends.

In some embodiments, the link processor analyzes the indications pertaining to a given entity, and automatically identifies whether this entity is likely to be a noisy entity. Several example criteria for identifying noisy entities are described herein. Using such criteria, the link processor can distinguish between legitimate intermediate entities, noisy entities and partially-noisy entities. For example, an entity whose contact list (i.e., the list of entities with which it communicates) grows over time at a high rate may be regarded as a noisy entity. As another example, an entity that communicates with a large number of entities in a single session (e.g., an entity that sends an e-mail message to a large list of contacts) may also be regarded as a noisy entity. Partially-noisy entities are sometimes characterized by a contact list that grows at a moderate rate over time.

Upon identifying a noisy entity, the link processor disqualifies the identified entity from serving as an intermediate entity. In other words, communication with noisy entities is disregarded when attempting to find relationships between entities. In some embodiments, the link processor holds a "black list" of noisy entities, which is updated continually. Thus, the disclosed techniques enable data analytics applications to identify relationships between entities with high reliability and small false alarm probability.

System Description

FIG. 1 is a block diagram that schematically illustrates a system 20 for large-scale link analysis, in accordance with an embodiment of the present disclosure. System 20 is connected to a communication network 24, and identifies and acts upon relationships between users 26 of the communication network. Systems of this sort can be deployed in various applications, such as fraud detection, anti-money laundering and crime investigation. Other usage examples comprise, for example, Web-page ranking schemes in search engines (e.g., schemes in which each Web-page is ranked based on the ranks of pages that point to it).

In the present example, network 24 comprises a cellular network, and the figure shows four users 26 denoted A . . . D. Alternatively, network 24 may comprise any other suitable wire-line or wireless communication network. For example, network 24 may comprise a Wide-Area Network (WAN) such as the Internet. The network typically serves a large number of users.

Although the embodiments described herein refer mainly to communication between communication network users, the disclosed techniques can be applied to various other kinds of relationships and interactions among entities, e.g., bank transactions, ownerships, kinship and other indications.

System 20 comprises a network interface 28, which receives from network 24 indications regarding communication sessions held between users 26. In the present example, interface 28 receives Call Detail Records (CDRs) produced in network 24, although any other type of information can also be used (for example e-mail communication or bank transfer records). System 20 further comprises a link processor 32, which carries out the methods described herein. In particular, processor 32 analyzes the CDRs so as to identify relationships between users 26. As part of the analysis process, link processor 32 identifies noisy users, i.e., users that potentially generate false relationships, using methods that are described in detail below.

The description that follows refers mainly to individual users. Alternatively, however, the disclosed techniques can be used to identify relationships among more generalized entities, such as groups of users, communication terminals (e.g., cellular phones or computers), groups of terminals or even entire organizations. Other types of entities may comprise, for example, e-mail addresses, Web-sites, bank accounts or home addresses.

Typically, link processor 32 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, processor 32 produces records that represent the relationships between entities, and stores the records in a relationship database 40. In some embodiments, database 40 is stored in-memory, i.e., in solid state memory such as Random Access Memory (RAM), thus providing fast access time to the records. Alternatively, database 40 may comprise a static database that is stored on a magnetic storage device, such as a Hard Disk Drive (HDD). In some embodiments, storage of the records is partitioned between an in-memory database and a static database.

Processor 32 may use any suitable data structure for storing the records in database 40. Certain aspects of storage and processing of relationship records are addressed in Israel Patent Application 201130, entitled "Systems and Methods for Large-Scale Link Analysis," filed Sep. 23, 2009, which is assigned to the assignee of the present patent application and whose disclosure is incorporated herein by reference. In some embodiments, processor 32 triggers alerts or other actions in response to changes that are detected in the relationships, e.g., by applying certain rules to the relationships stored in database 40. Certain aspects of applying rules to relationship data are addressed in Israel Patent Application 202686, entitled "Methods and Systems for Mass Link Analysis using Rule Engines," filed Oct. 12, 2009, which is assigned to the assignee of the present patent application and whose disclosure is incorporated herein by reference.

System 20 interacts with an operator 46 using an operator terminal 44. In particular, system 20 presents output to the operator using an output device such as a display 48, and accepts user input using an input device 52 such as a keyboard or mouse.

The system configuration shown in FIG. 1 is an example configuration, which is shown purely for the sake of conceptual clarity. In alternative embodiments, any other suitable configuration can also be used. For example, the functions of system 20 may be integrated with various other analytics functions in a single processor or computerized system. In an embodiment, the functions of system 20 are embodied in a switching element (e.g., Mobile Switching Center—MSC) of network 24.

In some embodiments, each identified relationship indicates that two entities are interrelated. Typically, two entities (e.g., individuals) are regarded as related if the CDRs indicate that they have communicated with one another. Processor 32 may apply any suitable technique and any suitable criteria for converting the information received from network 24 into a set of relationships. Various techniques for identifying relationships are known in the art, and any such technique can be used by processor 32. Example techniques are described, for example, by Svenson et al., in "Social Network Analysis and Information Fusion for Anti-Terrorism," Proceedings of the Conference on Civil and Military Readiness (CIMI), Enköping, Sweden, May 16-18, 2006, by Pan, in "Effective and Efficient Methodologies for Social Network Analysis," PhD Thesis submitted to Virginia Polytechnic Institute and State University, Dec. 11, 2007, and by Coffman et al., in "Graph-Based Technologies for Intelligence Analysis," Communications of the ACM (CACM), volume 47, issue 3, March 2004, pages 45-47, which are all incorporated herein by reference. In alternative embodiments, processor 32 does not generate the relationship indications, but rather receives them from another processor or system.

Generally, relationships may be symmetric (i.e., if entity A is related to entity B then B is necessarily related to A) or asymmetric. A relationship may be defined between entities of the same type (e.g., between two individuals) or between entities of different types (e.g., between an individual and a group of individuals). In some embodiments, processor 32 may assign each relationship one or more attributes. For example, a relationship may be assigned a strength or confidence level. In an example embodiment, entities that communicate frequently may be regarded by processor 32 as having a strong relationship, whereas entities that communicated only once or twice may be regarded as having a weak relationship. As another example, when analyzing bank transactions, the amount of money transferred between two entities may indicate the strength of the relationship. Additionally or alternatively, relationships may be assigned any other suitable attributes.

The set of relationship indications can be represented by a graph, in which nodes represent entities and edges represent relationships.

Figure 2:
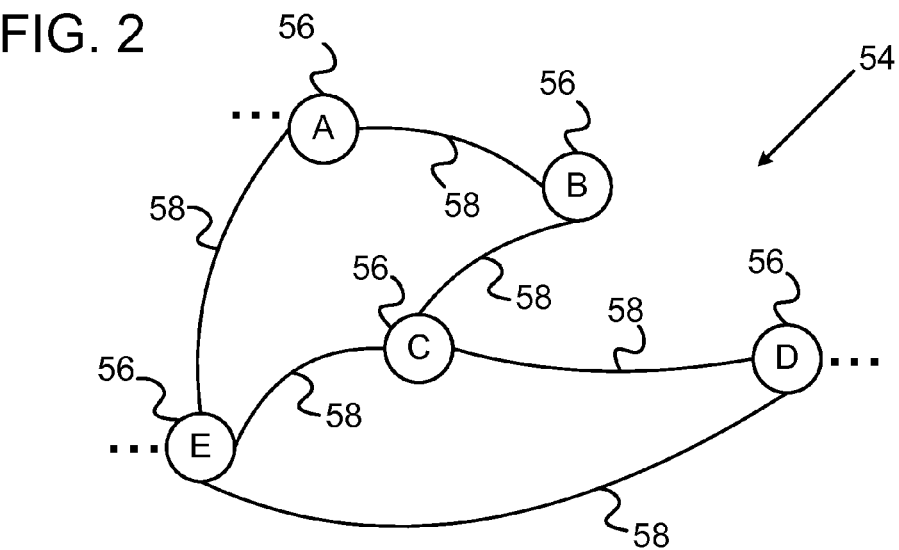
FIG. 2 is a diagram that schematically illustrates a relationship, in accordance with an embodiment of the present disclosure.

FIG. 2 is a diagram showing a relationship graph 54, in accordance with an embodiment of the present disclosure. Graph 54 comprises nodes 56 and edges 58. Each node 56 represents an entity (e.g., a network user or user group). An edge 58 between two nodes corresponds to a relationship between the corresponding entities. In the present example, the relationships are symmetric, and the graph edges are therefore not directed. The example of FIG. 2 shows a simple graph representing only five entities and six relationships for the sake of clarity. In practice, however, relationship graphs in real-life applications may comprise many millions of entities (nodes) and relationships (edges). For example, a small cellular operator may have over two million subscribers, and over twenty million CDRs per day. A bank may have over 500,000 accounts, and over two million transactions per day.

Typically, processor 32 stores the relationship graph in database 40, using a suitable data structure. In some embodiments, processor 32 accepts the relationship graph as input. Alternatively, processor 32 may produce the relationship graph based on CDRs or other information received from network 24. In some embodiments, processor 32 continually updates the relationship graph in response to new indications that are received from network 24. In alternative embodiments, processor 32 may construct and store any other suitable data structure that represents the relationships among the entities.

Identification of Intermediate Entities and Noisy Entities

In many practical cases, entities that are interrelated do not communicate directly with one another. For example, fraudulent users who are related to one another may refrain from direct communication, and may communicate only via intermediate entities. In some embodiments, processor 32 identifies two or more entities as interrelated by detecting an intermediate entity with which they communicate.

For example, in relationship graph 54 of FIG. 2 above, entities B and E do not communicate directly with one another (i.e., the graph does not have any edge 58 that connects nodes B and E directly). Nevertheless, entities B and E both communicate with entity C. This mutual contact may indicate that entities B and E are interrelated, even though they do not communicate directly with one another. Entity C is referred to as an intermediate entity that connects entities B and E. The present example refers to two interrelated entities. Generally, however, processor 32 may detect intermediate entities that connect any suitable number of entities, and thus indicates a possible relationship among them.

In some cases, however, two or more entities may communicate with a certain intermediate entity without necessarily being related to one another. For example, telephone numbers of service providers (e.g., toll-free numbers, phone directory assistance, airline reservation, technical support and pizza delivery telephone numbers) conduct calls with many entities that are not necessarily interrelated. In all of these examples, most of the users who conduct calls with such intermediate entities are not interrelated in any way. Intermediate entities of this sort (i.e., entities that communicate with unrelated entities with high likelihood) are referred to herein as noisy entities or spam entities.

Unless identified and accounted for, noisy entities may generate false relationships, i.e., erroneously point out unrelated entities as interrelated. In other words, if a noisy entity were added to relationship graph 54, the graph would have a large number of false edges 58 that do not correspond to genuine relationships between entities. In such a scenario, processor 32 would be likely to produce erroneous or distorted results.

In some embodiments, processor 32 automatically identifies entities that are suspected of being noisy entities. Upon identifying a noisy entity, the CDRs (or other indications from network 24) associated with the noisy entity are not used for updating relationship graph 54. As a result, processor 32 is prevented from identifying false relationships caused by the noisy entity. Processor 32 typically identifies a given entity as noisy by evaluating a criterion with respect to the CDRs associated with this given entity. Processor 32 may use any suitable criterion for this purpose.

In some embodiments, processor 32 assesses the rate at which the contact list of the given entity grows over time (i.e., the growth rate of the total number of entities with which the given entity communicates), and identifies the entity as noisy based on the assessed growth rate of the contact list. For example, processor 32 may regard a certain entity as noisy if the contact list of this entity grows at a rate that exceeds a predefined value. In an example embodiment, if a given phone number conducts calls with more than two new entities over a period of thirty seconds, then this phone number will be regarded as a noisy entity. Typically, the growth rate of the contact list is assessed over relatively short time intervals, e.g., on the order of seconds. Alternatively, however, any other suitable time intervals can also be used.

In some embodiments, processor 32 assesses the number of entities with which a given entity communicates in a single session, and identifies the entity as noisy based on this number. This sort of criterion is particularly suitable for e-mail communication. In many cases, an e-mail message that is addressed to a large number of recipients is likely to indicate a spam message that should be disregarded. Thus, for example, processor 32 may regard a certain entity as noisy if this entity sends an e-mail message to a number of recipients that exceeds a certain value.

The above-described criterion may be particularly useful for analyzing traffic over public networks. When analyzing traffic in an organization network, on the other hand, e-mail messages addressed to many recipients may be useful for mapping key employees and the relationships between them. Therefore, when analyzing traffic over organization networks, noisy entities of this sort may not be disregarded but treated differently.

In some cases, a given intermediate entity generates both valid relationships and false relationships. For example, the telephone number of a doctor or plumber may conduct calls with many unrelated clients. On the other hand, the same doctor or plumber may communicate with some entities that are genuinely related to one another, such as colleagues, family members or friends. An entity of this sort is referred to herein as a partially-noisy entity.

Processor 32 may apply various criteria for identifying partially-noisy entities, and for distinguishing between false and genuine relationships of a partially-noisy entity. For example, Genuine relationships typically involve communication with entities that recur over a long time period, e.g., on the order of days or weeks. False relationships, on the other hand, are typically sporadic. Thus, in some embodiments, processor 32 assesses the growth rate of a given entity's contact list over a relatively long time period. If the assessed growth rate is moderate, e.g., higher than a predefined minimum value and lower than a predefined maximum value, processor 32 may regard the entity as a partially-noisy entity.

For a given entity that communicates with a partially-noisy entity, processor 32 may apply various criteria to determine whether or not this entity is genuinely related to the partially-noisy entity. For example, processor 32 may regard the given entity as having a genuine relationship if it communicates with the partially-noisy entity more than a certain number of times over the assessment time period (e.g., days or weeks). Otherwise, i.e., if communication with the given entity is sporadic rather than recurring, processor 32 may decide that this entity is not related to the partially-noisy entity.

Consider, for example, a phone number of a plumber who conducts approximately fifty calls per day. Approximately ten calls per day are with new entities, and the other calls are with recurring entities. Over an assessment period of two weeks, approximately 100 new contacts are created. The plumber's phone number in this example may be regarded as a partially-noisy entity. The recurring contacts may be regarded as genuine relationships that are to be added to relationship graph 54. The sporadic contacts may be regarded as false relationships that should be disregarded.

In some embodiments, processor 32 assigns a numerical score to each entity that communicates with a given partially-noisy entity. The score is accumulated over the assessment period (e.g., days or weeks). Entities that communicate with the partially-noisy entity multiple times are assigned higher scores. Entities that communicate with the partially-noisy entity once, or a small number of times, over the assessment period are assigned lower scores.

Processor 32 may consider the scores when updating the relationship graph. For example, processor 32 may update the relationship graph only based on communication with entities whose score exceeds a certain threshold. As another example, processor 32 may remove an edge and/or a node corresponding to a low-score entity, if this entity did not communicate with the partially-noisy entity for a predefined time period.

The criteria described above are example criteria, which are shown purely for the sake of conceptual clarity. Additionally or alternatively, link processor 32 may apply any other suitable criteria for identifying noisy entities, partially-noisy entities and/or legitimate intermediate entities.

In some embodiments, link processor 32 holds a "black list" of entities that are identified as noisy. The processor may store the black list in database 40, or in any other suitable location. When updating relationship graph 54 in response to newly-arriving indications from network 24, processor 32 ignores indications that are associated with entities belonging to the black list. In some embodiments, the black list may also indicate the partially-noisy entities.

Figure 3:
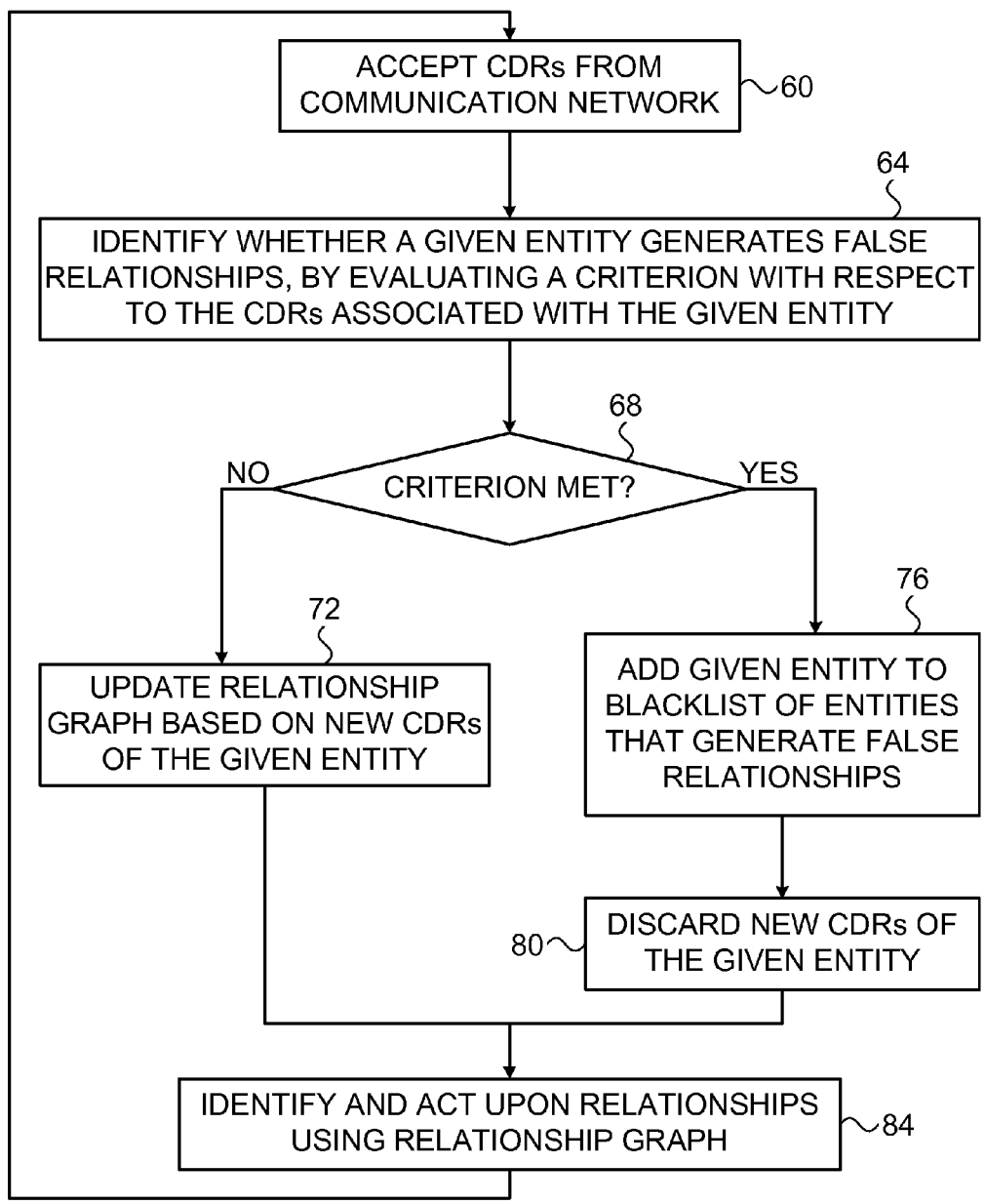
FIG. 3 is a flow chart that schematically illustrates a method for identifying entities that generate false relationships, in accordance with an embodiment of the present disclosure.

FIG. 3 is a flow chart that schematically illustrates a method for identifying noisy entities that generate false relationships, in accordance with an embodiment of the present disclosure. The method begins with system 20 receiving CDRs from network 24, at an input step 60. Each CDR indicates communication between entities. Link processor 32 evaluates whether a given entity is likely to be a noisy entity by evaluating a criterion with respect to the CDRs associated with this entity, at a criterion evaluation step 64. Any suitable criterion, such as the example criteria described above, can be used for this purpose.

Processor 32 checks whether the criterion is met, at a checking step 68. If the criterion is not met (i.e., if the given entity is likely to be a legitimate intermediate entity) processor 32 updates relationship graph 54 based on the CDRs associated with the given entity, at a graph updating step 72. If, on the other hand, the criterion is met, processor 32 identifies the given entity as noisy. The processor adds the identified noisy entity to the black list, at a black list updating step 76. Processor 32 disregards subsequent CDRs that are associated with the given entity when updating the relationship graph, at a discarding step 80.

Processor 84 acts upon the relationships of the relationship graph, at an action step 84. The processor may trigger alerts to operator 46 and/or take any other suitable action. The method then loops back to step 60 above, in which system 20 continues to accept and analyze CDRs from network 24.

Although the embodiments described herein mainly address applications such as Fraud detection, the principles of the present disclosure can also be used for additional applications, such as detection and prevention of money laundering and other types of financial crime, Web page ranking, Data leakage prevention and criminal investigations.

Identification of Commonly Used Communication Terminals

Embodiments described in the present disclosure present improved methods and systems for determining mobile communication terminals (mobiles) that have a common user, or that have a group of users in common. The methods and systems examine change-of-association events of mobiles operating in a network, and correlate the events to determine common mobiles, i.e., mobiles that have the same or similar change-of-association events. The events described are generated by the mobiles themselves automatically, by virtue of the fact that the mobiles are operating in the network. There is thus no need for, and the embodiments described herein do not require, user intervention to generate the events.

The change-of-association events may be automatically transmitted by mobiles when the mobiles perform certain predetermined types of location change within the network. Base transceiver stations (BTSs) of the network transmit into respective sectors, and are typically divided into groups of stations having a common location area code (LAC). A typical change-of-association event comprises a "location update request" (LUR) that the mobile transmits when it transfers from being in communication with, and so being associated with, a first BTS having a first LAC, to being in communication with a second BTS having a second LAC. LURs occurring in the network are collected and analyzed to find correlations between LURs generated by different mobiles. The analysis typically identifies pairs of mobiles that transmit LURs at approximately the same time, that are generated in response to beginning to communicate with the same LAC, and with the same sector or, in some embodiments, an adjacent sector.

In some embodiments, a weight is attached to each pair of mobiles identified by the analysis, the weight typically being larger according to how many times a given pair of mobiles generates corresponding LURs. Thus a pair of mobiles that transfers to two or more LACs (as determined by the LURs generated by the mobiles) is given a greater weight than another pair that only registers as transferring to one LAC.

By correlating the LURs, the methods and systems described herein provide a highly reliable way of detecting multiple mobiles that are associated with each other, by being used by one user, or by being used by a group of users travelling together. Furthermore, by using LURs, embodiments described herein do not rely on any user action concerning operation of the mobiles.

System Description

Figure 4:
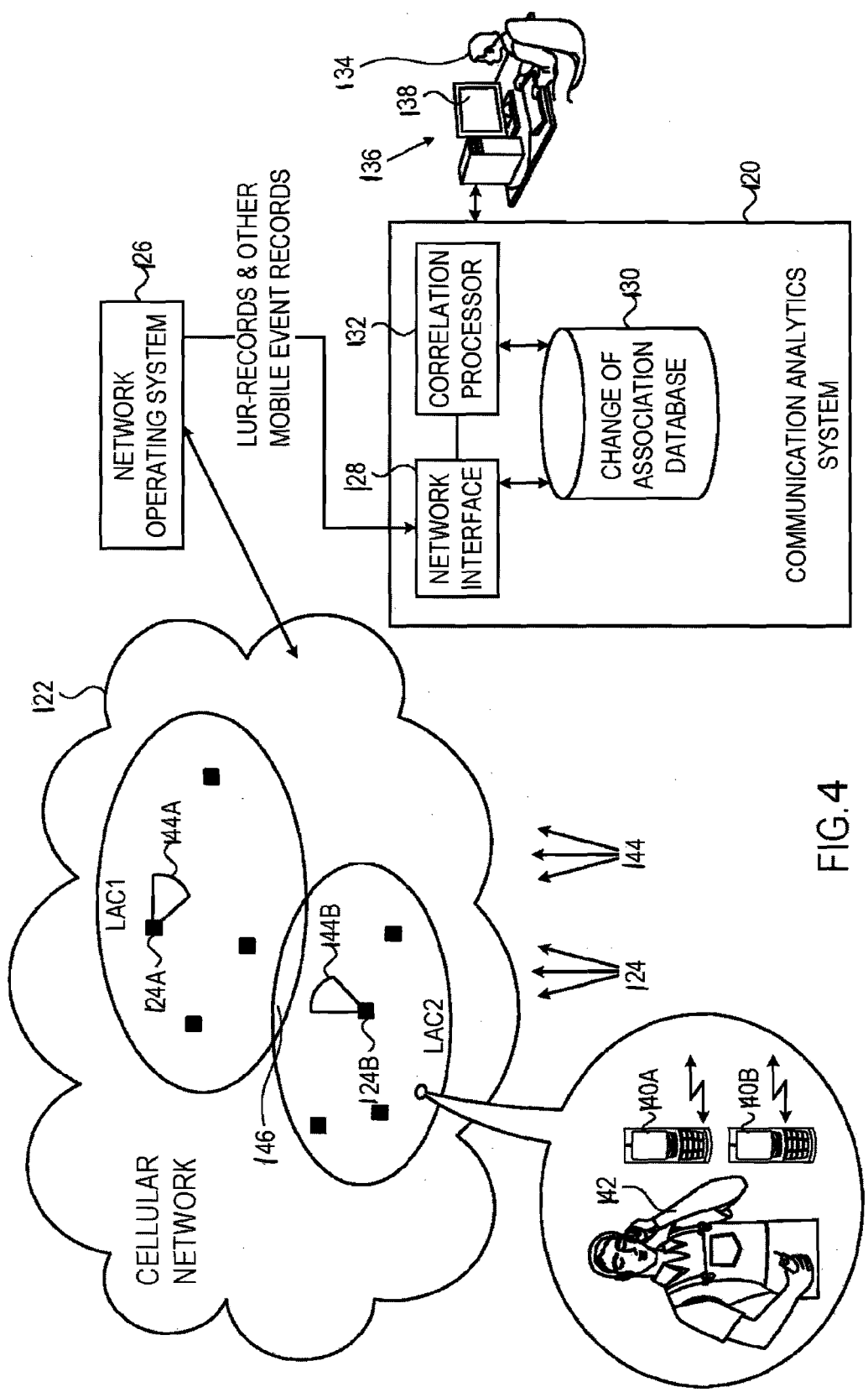
FIG. 4 is a schematic block diagram illustrating a communications analytics system, according to an embodiment of the present disclosure.

Reference is now made to FIG. 4, which is a schematic block diagram illustrating a communications analytics system 120, according to an embodiment of the present disclosure. The system may be used, for example, by a government or law enforcement agency to track mobile communication terminals (e.g., cellular phones) that are operated by individuals under surveillance. Mobile communication terminals are also referred to herein as mobiles, mobile terminals, communication terminals, or terminals. System 120 is connected to a cellular network 122, the network having a number of generally similar base transceiver stations (BTSs) 124 which transmit and receive signals from mobile terminals operative in the network. As necessary in this disclosure, BTSs and elements associated with the BTSs are differentiated by appending a letter to the identifying numeral of the BTS (24) or of the element. Network 122 is controlled by a network operating system 126, which typically comprises one or more processing units together with associated volatile and non-volatile memories.

As is described in more detail below, analytics system 120 receives data from network operating system 126 via a network interface 128 comprised in the analytics system. The data is stored in a change-of-association database 130, and is processed by a correlations processor 132. An operator 134 of system 120 typically uses a computing facility 136, comprising a processor and volatile and non-volatile memories, to operate system 120.

Facility 136 typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Facility 136 comprises a graphic user interface (GUI) 138, wherein results derived generated by the analytics system may be presented to operator 134. In some embodiments, some or all of the components of analytics system 120 may be incorporated into computing facility 136. Alternatively, system 120 and the functions performed by facility 136 may be implemented at least partly in custom built hardware.

Cellular network 122 and the mobile terminals operative in the network function according to a cellular communication protocol. While the protocol may be any such protocol, in the following description the network is, for simplicity and by way of example, assumed to operate according to an industry standard Global System for Mobile (GSM) communication protocol.

Typically, a mobile terminal transmits and receives signals via a specific BTS based on the signal strengths received at the mobile and at the BTS. Consequently, during a typical communication session wherein the mobile is moving, the mobile terminal may usually communicate with more than one BTS.

Some of the users of network 122 may operate multiple mobile communication terminals. In the example of FIG. 4, two terminals 140A and 140B operated by a user 142 communicate with network 122. In general, user 140 may operate any desired number of terminals, and the terminals may comprise, for example, cellular phones, wireless-enabled mobile computers, and/or Personal Digital Assistants (PDAs), and/or any other type of communication terminal operative in network 122. While FIG. 4 shows a single user and two terminals for the sake of simplicity and clarity, in general network 122 supports a large number of users and some of these users typically operate multiple, i.e., two or more, terminals. Embodiments described herein, inter alia, identify multiple terminals which are being operated by a single user.

Each BTS 124 serves mobile terminals that are in a sector 144 associated with the BTS, the sectors corresponding to the cells into which network 122 is divided. As shown in FIG. 4, a BTS 124A communicates with mobiles in a sector 144A, and a BTS 124B communicates with mobiles in a sector 144B. For simplicity, other sectors of the BTSs are not shown in FIG. 4. In order for a BTS to communicate with mobiles in its sector, the BTS uses an identity code, herein termed the cell-ID of the BTS, to identify itself. For simplicity, in the following description except where otherwise stated the term BTS is assumed to comprise the sector or cell to which the BTS communicates.

In order for mobile terminals to operate in network 122, the mobiles require a mobile identification which is validated by network operating system 126. Typically, and as assumed in the present disclosure, the mobile identification comprises the International Mobile Subscriber Identity (IMSI) of the mobile. Typically, once a mobile has been validated for operation in network 122, system 126 may assign a temporary identification to the mobile so that it is able to continue operation in the network. There is a one-to-one correlation between the temporary identification and the IMSI of the mobile, which system 126 is able to use, if necessary.

In network 122 the cells or base stations of the network are clustered into groups. Such a group is termed a LAC (Location Area Code).

When a mobile is in idle mode (i.e. is not actively communicating with the network), the mobile decides which cell to monitor based on the received signal strength. The mobile may switch between different cells of the same LAC, without informing the network.

Whenever the network needs to communicate with the mobile, it sends the mobile a paging request. The paging request is transmitted on all cells of the LAC in which the network knows the mobile is present. (If the mobile does not respond, the network assumes the mobile device is in an area with no reception, or was turned off without informing the network.)

Therefore, whenever the mobile moves to a cell that is in a different LAC than its current cell, it must inform the network that it has moved to a new LAC.

The determination of the grouping of cells into LACs is typically made by the network operator. In order to reduce the amount of LAC changes by mobiles (and therefore the amount of traffic generated in the process), a LAC typically comprises cells in a specific geographic area.

There is a trade-off when choosing the size of the LAC (i.e. how many cells belong to it). If the LAC is very large, the amount of LUR events due to LAC changes is small. On the other hand, each paging request is transmitted on a large number of cells. If the LAC is very small, fewer paging requests are transmitted in each cell, but the number of LAC changes increases.

A typical goal of the network operator is to optimize the LAC grouping of cells (BTSs) in such a way that the total communication load associated with LURs due to LAC changes and with paging requests is minimized. This can be achieved either by automatic network planning tools, or manually by network engineers.

FIG. 4 illustrates two such groups of BTSs, termed LAC1 and LAC2.

As stated above, a mobile terminal communicates with a particular base station, selected from a set of BTSs with which the mobile may communicate, based on the signal strength received from the stations. Whenever a mobile switches to a base station belonging to a different LAC than the current base station, it initiates a first type of Location Update Request (LUR), to inform network operating system 126 that the mobile has changed the group of network cells with which the mobile is associated.

A mobile which is already active in the network (i.e., a mobile which has not just been switched on) may also initiate a second type of LUR even without changing the LAC with which it is associated. In this case the mobile initiates a second type of LUR if a predetermined time period has passed since the last active communication between the mobile and the network. The predetermined time period is configured by the network operator, and transmitted to mobiles on a broadcast channel of the cell.

An LUR comprises a request from the mobile for the network to register the LAC in which the mobile is now operating, the LAC in which the mobile previously operated, and an identification of the mobile. The LUR also includes an indicator signifying which type of LUR is being sent.

The first and second types of LURs are distinguished herein by being referred to respectively as LAC-change-LURs and periodic-LURs.

Some networks operate according to a standard wherein, on switching on, the mobile transmits a third type of LUR. (The indicator included in the LUR signifies the third type.) For simplicity, in the disclosure hereinbelow only the first two types of LUR are considered, and those having ordinary skill in the art will be able to adapt the disclosure, mutatis mutandis, to account for the third type of LUR.

A LAC-change-LUR may be considered to be a "change-of association triggered network event," and typically occurs if the mobile changes its location, so changing from one LAC to another.

Furthermore, if two different mobiles are moving together, such as mobiles 140A and 140B of user 142, they usually perform their LAC-change-LURs, their change-of-association events, within the same BTS sector, and the two events typically occur within a relatively short time, usually within up to 15 seconds apart. In some embodiments the LAC-change-LURs are performed within adjacent BTS sectors. It will be understood that the LAC-change-LURs of the two mobiles do not depend on a user action, apart, typically, from the user's change of location. Consequently, and as described below, determining positive correlations between LAC-change-LURs enables easy and accurate determination of multiple mobile terminals that are operated by one user, or of multiple mobiles operated by a group of users moving or traveling together. These correlations do not depend on the user interacting with the mobiles, since the LAC-change-LURs are generated by a geographical movement of the user.

Apart from LAC-change-LURs generated due to geographical movements of a user, there may be LAC-change-LURs generated by a mobile that is in a vicinity of a border between two different LACs, or that is in a region of overlapping LACs, such as a region 146. A mobile in such a vicinity or region may switch between two BTSs in the different LACs, typically because of changes of signal strengths at the two BTSs. In this case, a mobile may initiate a relatively large number of LAC-change-LURs, even when the user of the mobile is not moving, or is only moving within a restricted area. Embodiments of the present disclosure allow for these particular types of LAC-change-LURs in evaluating the correlations referred to above.

For each LUR (LAC-change-LURs and periodic-LURs), network operating system 126 stores a respective LUR-record. Table I below exemplifies parameters that are typically in each LUR-record, and a symbol used to represent each parameter.

TABLE I

| Parameter | Symbol |
| --- | --- |
| A timestamp indicating a time at which the mobile generates the LUR. | TIMESTAMP |
| An identification of the mobile, herein assumed to be the IMSI of the mobile. | IMSI |
| An identification of the sector in which the mobile is currently operating. The identification comprises the LAC and the cell-ID of the sector. The identification may also include parameters such as the country and the network of the sector. | CURRENT_LAC CELL-ID |

TABLE I-continued

| Parameter | Symbol |
|---|---|
| An optional identification of the LAC in which the mobile previously operated. While PREVIOUS_LAC may be present in the LUR transmitted by the mobile, some embodiments may not incorporate it in the LUR-record. Typically, the network may use a predetermined PREVIOUS_LAC code, such as hexadecimal FFFE, to indicate an LUR which is generated by a mobile coming from a "no reception" mode. | PREVIOUS_LAC |
| A location of the mobile. The location may be derived from geographical parameters associated with the sector into which the mobile has moved. Herein, for simplicity, the location is assumed to be identified by the cell-ID. | CELL-ID |
| An optional identification of the type of LUR (LAC-change-LUR or periodic-LUR). While an identification of the type may be present in the transmitted LUR, some embodiments may not incorporate it in the LUR-record. | TYPE |

As described below, analytics system 120 receives LUR-records that have been stored in system 126, via network interface 128. The LUR-records are assumed hereinbelow, except where otherwise stated, to comprise TYPE but not to comprise PREVIOUS_LAC. The records may be received on a substantially continuous basis, or alternatively in groups that are typically transmitted from system 126 periodically. Hereinbelow, by way of example, the LUR-records are assumed to be transmitted to analytics system 120 as a batch of records every minute. The correlation processor stores the received batches of LUR-records in database 130 for future processing.

In addition to storing LUR-records, system 126 stores in database 130 records of other mobile events, comprising parameters of communications between mobiles 140 and network 122. Analytics system 120 also receives these mobile event records, herein referred to as other-mobile-event-records, as required. The parameters included in the other-mobile-event-records include an IMSI of a given mobile, a CELL_ID of the BTS communicating with the mobile, and a time, identified herein as EVENT_TIMESTAMP, at which the communicating event occurs. System 120 uses the LUR-records and the other-mobile-event-records, as described below with reference to FIG. 5, to itemize an "interfering cells" list.

Figure 5:
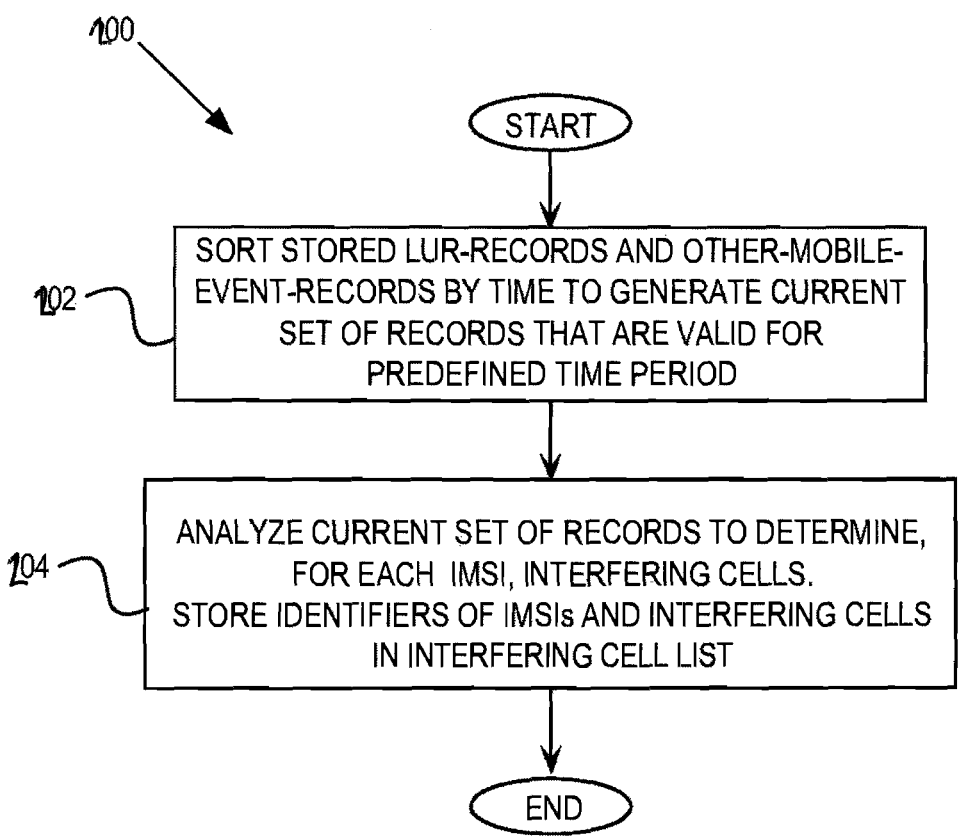
FIG. 5 is a schematic flowchart of a procedure to determine interfering location update requests, according to an embodiment of the present disclosure.

FIG. 5 is a schematic flowchart 200 of a procedure to generate an interfering cells list, according to an embodiment of the present disclosure.

The procedure compiles a list of common cells each mobile tends to stay in, for example, cells serving a mobile user's home, work etc. Typically, the procedure analyzes the LUR-records and the parameters of the other mobile event records referred to above in order to determine dominant cells in which a given mobile stays during specific time periods. The time periods may be any convenient time period set by operator 134; hereinbelow the time periods are assumed by way of example to be hourly periods.

As is explained in more detail with reference to the flowchart of FIG. 6, the interfering cells list allows embodiments described herein to accept as valid LURs those LURs that are similar, for example that are caused by a mobile user travelling the same route on a daily basis, but which do not correspond to a dominant cell location wherein the mobile stays for a relatively long time period. Such valid LURs are not filtered out because the mobile does not stay in the cells generating these LURs, in contrast to the cells of the interfering cells list wherein the mobile does stay.

The procedure of flowchart 200 is typically performed periodically on the LUR-records stored in change-of-association database 130. By way of example, the procedure is assumed to be performed once a day.

In an initial step 202, correlations processor 132 sorts LUR-records and other-mobile-event-records that have been saved in database 130 into those that have been received within a predefined time period, using TIMESTAMP and EVENT_TIMESTAMP values of the records. The predefined time period is herein assumed, by way of example, to be one month, although any other convenient length of time may be used. The processor deletes the previous records (LUR-records and other-mobile-event-records) from database 130, so as to maintain a current set of records that are valid for the preceding month. It will be understood that since the flowchart procedure is performed daily, step 202 ensures that the current set of records is updated daily.

In an analysis step 204, processor 132 analyzes the current set of records according to their IMSI and CELL-ID. For a given IMSI, the list of events during the predefined time period is analyzed, so that a "time percentage" is calculated for each cell. The time percentage is an estimation of the percentage of the time the mobile spends in this location, based on overall mobile activity. Any cells with a time percentage above a certain predefined threshold are identified as "interfering cells" for the mobile's IMSI. It will be understood that the events analyzed to determine the overall mobile activity include, but are not limited to, LAC-change-LURs generated by a mobile being in the vicinity of a border between two LACs, as well as periodic-LURs.

A typical predefined threshold percentage is approximately 10%-15%, although any other suitable threshold percentage may be used.

Each IMSI typically has one or more interfering cells. For each IMSI and corresponding interfering cell the processor stores an interfering cell IDENTIFIER: {IMSI, CELL-ID} in an interfering cell list in database 130. The interfering cell list is used to filter the batches of records received at the analytics system, as described with reference to flowchart 250 of FIG. 6.

Figure 6:
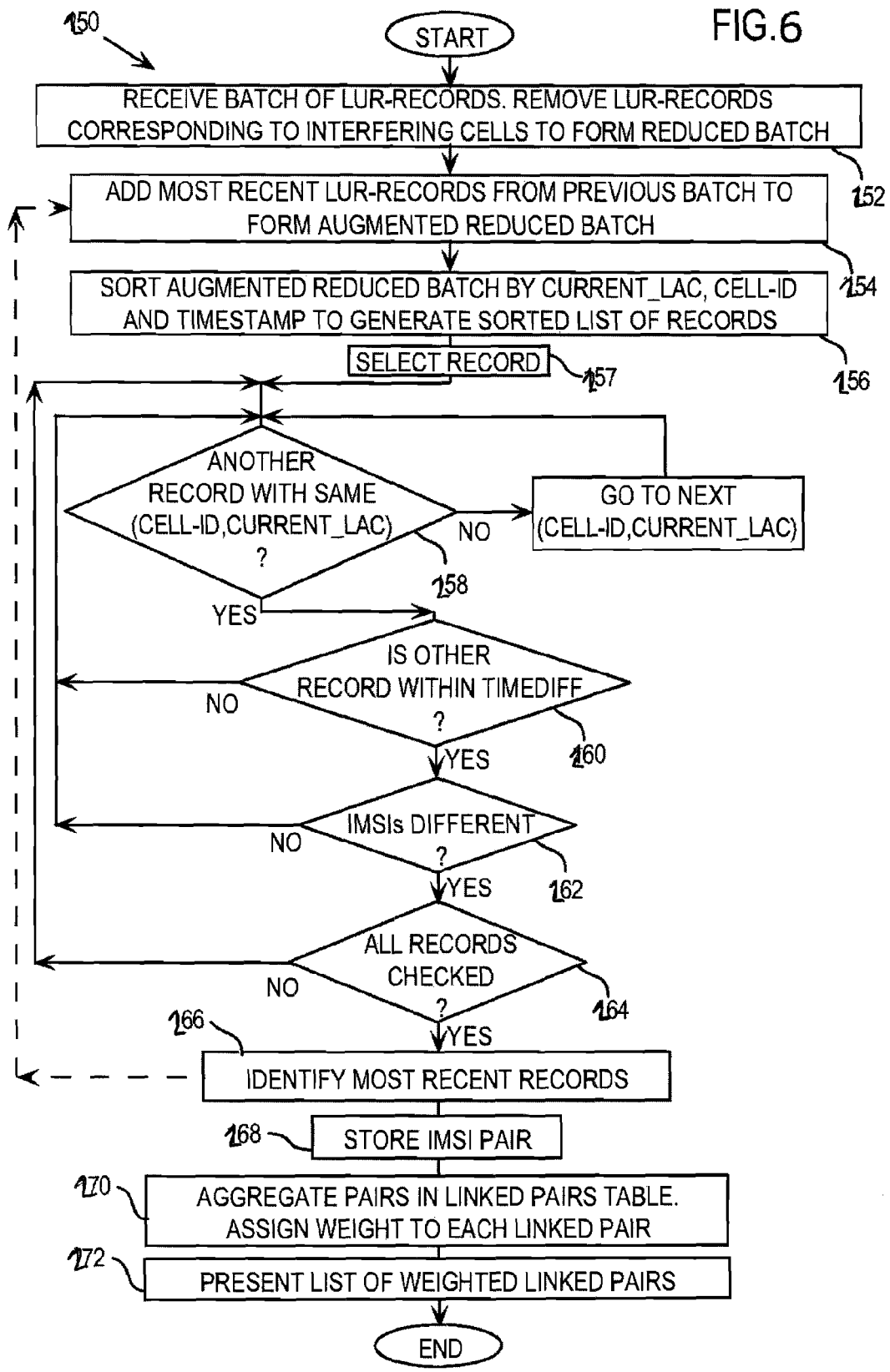
FIG. 6 is a schematic flowchart of a procedure to identify mobile terminals having at least one common user, according to an embodiment of the present disclosure.

FIG. 6 is a schematic flowchart 250 of a procedure to identify mobile terminals having a common user, or having a group of users travelling or moving together, and FIG. 7 and FIG. 8 are schematic tables derived from the procedure, according to embodiments of the present disclosure. Correlation processor 132 operates the procedure on each batch of LUR-records received from system 126.

In a first step 252 an initial batch of LUR-records is stored in database 130. Processor 132 checks each of the LUR-records of the initial batch to find if it corresponds with one of the interfering cell IDENTIFIERS that have been determined in the procedure of FIG. 5. The check is performed by comparing the IMSI and CELL-ID of each of the LUR-records in the batch against the IDENTIFIERs of the interfering cell list. Any LUR-records in the batch for which the comparison is valid are not considered in the following analysis, which is performed on a "reduced batch" of LUR-records from which the records satisfying the comparison have been removed.

In some embodiments the check of first step 252 is performed only on LAC-change-LURs (using the TYPE parameter) of the initial batch, since typically the interfering cell list includes IDENTIFIERS corresponding to periodic-LURs of the initial batch.

In an augmentation step 254, a set of most recent records from a previous batch of LUR-records is added to the reduced batch, to produce an "augmented reduced batch." An explanation of the determination of records in the set of most recent records is given below with reference to step 266.

In a sort step 256, the records in the augmented reduced batch are itemized and sorted by CURRENT_LAC, CELL-ID, and then by TIMESTAMP to produce a sorted list of LUR-records, so that for each (CELL-ID,CURRENT_LAC) group the most recent record is last.

FIG. 7 schematically illustrates in tabular form parameters of the itemized sorted list that may be used in the following steps of flowchart 250.

Returning to FIG. 6, after the augmented reduced batch has been sorted, in a selection step 257, a first record of the sorted list is selected. Typically, the record is the most recent record of a last (CELL-ID,CURRENT_LAC) group in the itemized list.

In a series of comparisons 258, 260, 262, and 264 the processor compares each of the records for a given (CELL-ID,CURRENT_LAC) with the other records for that (CELL-ID,CURRENT_LAC), to find pairs of records that occurred within a preset time interval TIMEDIFF. Such records are herein termed matched records. As is described below, the matched records comprise IMSIs that are linked.

Comparison 258 ensures that all records for a given (CELL-ID,CURRENT_LAC) are checked before a next (CELL-ID,CURRENT_LAC) is checked. Comparison 260 verifies that the difference between the TIMESTAMP values of the matched records is less than TIMEDIFF. Comparison 262 checks that the matched records of a pair have different IMSIs. Comparisons 258, 260, and 262 act as an inner loop. A comparison 264, which checks if all records have been checked, ensures that the inner loop is repeated, so that comparison 264 acts to form an outer loop.

The comparisons effectively compare a record from a given mobile with records of mobiles which are candidates for being associated with the given mobile.

In one embodiment TIMEDIFF is set to be 15 seconds. For each (CELL-ID,CURRENT_LAC) the comparisons are typically performed beginning with the record having the most recent value of TIMESTAMP, i.e., the "newest" record, proceeding backwards sequentially along the sorted list of step 256 to the oldest record.

FIG. 7 shows, as records that are linked by double-headed arrows, pairs of records that result from a positive return to comparison 262.

In a record reservation step 266, the processor analyzes the records of the initial batch to determine records that are within a time interval of TIMEDIFF from the last record of the batch. The "most recent records" from a previous batch are added to the received batch of records in augmentation step 254, as indicated by dashed arrows from step 266 to step 254.

In a storage step 268, processor 132 stores matched pairs, i.e., mobiles that are linked or associated with each other and that have been determined using the steps (not including step 266) and comparisons described above, in a temporary matched pair table. Each stored matched pair comprises the IMSIs of the two mobiles generating the two corresponding LUR-records, and the (CELL-ID,CURRENT_LAC) that is common to these records. Typically, the stored matched pairs also include the TIMESTAMPS for the two LUR-records.

In an aggregation step 270, the matched pairs from a number of batches that have been stored in the temporary matched pair table are analyzed. Typically, aggregation step 270 is performed periodically. In one embodiment the step is performed daily, and the analysis generates a date, the values of the IMSIs of each of the matched pairs, and a "link strength" for each of the pairs. The link strength is a weight that corresponds to a probability that the two mobiles of the pair are common to a single user, or to a group of users moving together. The probability is typically higher the larger the number of matched pairs for a given pair of mobiles. The probability may be reduced because of geographical factors, for example, if the matched pairs for the given pair of mobiles occur in CELL-IDs that comprise a well-traveled route such as a highway or a rail line.

In a final step 272, operator 134 receives the results of step 262 as a list of pairs comprising the date, paired IMSIs, and a link strength of each listed pair. The list of pairs may be presented to the operator on GUI 138 (FIG. 4).

FIG. 8 shows in tabular form a schematic list of pairs derived from the table of FIG. 7. The column titled Linked Mobiles shows mobiles that procedure 250 has determined are associated or linked with each other. The linked strength values shown in FIG. 8 correspond to the number of occurrences wherein the linked IMSIs appear in the table of FIG. 7, and are given by way of example. Since the number of times a set of linked mobiles actually appears in common may be relatively large, it will be understood that actual numbers of times the linked IMSIs appear in a table exemplified by the table of FIG. 7 may be of the order of tens, or even hundreds.

The description of the procedures above assumes that parameter TYPE is available for the records analyzed in system 120, that parameter PREVIOUS_LAC is not available, and that correlations are checked for mobiles that are in the same sector. Those having ordinary skill in the art will be able to adapt the description, mutatis mutandis, for cases where TYPE is not available, and/or where PREVIOUS_LAC is available, and/or where mobiles may be in adjacent sectors, and all such cases are assumed to be comprised within the scope of the present disclosure. It will be understood that while the procedures above chiefly describe finding pairs of mobiles that are linked by being used by one user, substantially the same procedures may be used to find more than two mobiles that are similarly linked. Furthermore, it will be appreciated that the mobiles detected by the procedures described above do not need to be used by one user, but may be used by a group of users who are travelling together. Such a group may, for example, comprise the driver and passengers in one or more vehicles which travel over a common path, and who are in approximately the same location on the path at approximately the same time.

It will also be understood that comparisons other than those described above may be implemented, typically in addition to those described above, to check the commonality of IMSIs. Such comparisons include, but are not limited to, checking that a time interval between two pairs of IMSIs is not unduly small, with regard to a geographical separation of the CELL-IDs of the pairs, and/or checking if one IMSI of a pair occurs without the other IMSI in another CELL-ID. The results of such other comparisons may be applied to the evaluation of the link strength.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:

accepting indications of communication conducted among entities over a communication network;

using a link processor, analyzing the indications of communication so as to identify that two or more of the entities are interrelated by detecting one or more intermediate entities with which the two or more entities communicate;

evaluating a criterion with respect to the indications of communication associated with a given entity, the criterion being determined in accordance with a growth rate of a total number of the entities that communicate with the given entity; and responsively to meeting the criterion, disqualifying the given entity from serving as an intermediate entity in analyzing the indications, wherein evaluating the criterion further comprises determining that the given entity generates both false interrelationships and genuine interrelationships among the entities.

2. The method according to claim 1, wherein analyzing the indications comprises constructing a data structure that represents relationships among the entities, and wherein disqualifying the given entity comprises disregarding the indications associated with the given entity in constructing the data structure.

3. The method according to claim 2, wherein disqualifying the given entity comprises adding the given entity to a list of disqualified entities, and wherein constructing the data structure comprises updating the data structure only in response to the indications associated with the entities that do not belong to the list.

4. The method according to claim 1, wherein evaluating the criterion and disqualifying the given entity comprise disqualifying the given entity responsively to assessing that the growth rate exceeds a predefined value.

5. The method according to claim 1, wherein the criterion depends on a number of the entities with which the given entity communicates in a single communication session.

6. The method according to claim 1, wherein evaluating the criterion comprises determining that the given entity indicates false interrelationships among the entities.

7. The method according to claim 1, wherein determining that the given entity indicates both the false interrelationships and the genuine interrelationships comprises identifying that a growth rate of a total number of the entities that communicate with the given entity falls between predefined minimum and maximum values.

8. The method according to claim 1, comprising assigning respective scores to the entities that communicate with the given entity, and distinguishing between the false interrelationships and the genuine interrelationships responsively to the scores.

9. A system, comprising:

an interface, which is configured to accept indications of communication conducted among entities over a communication network; and a link processor, which is configured to analyze the indications of communication so as to identify that two or more of the entities are interrelated by detecting one or more intermediate entities with which the two or more entities communicate, to evaluate a criterion with respect to the indications associated with a given entity wherein the criterion is determined in accordance with a growth rate of a total number of the entities that communicate with the given entity, and, responsively to meeting the criterion, to disqualify the given entity from serving as an intermediate entity in analyzing the indications, wherein the criterion determines that the given entity indicates both false interrelationships and genuine interrelationships among the entities.

10. The system according to claim 9, wherein the link processor is configured to construct a data structure that represents relationships among the entities, and to disregard the indications associated with the given entity in constructing the data structure.

11. The system according to claim 10, wherein the link processor is configured to add the given entity to a list of disqualified entities, and to update the data structure only in response to the indications associated with the entities that do not belong to the list.

12. The system according to claim 9, wherein the link processor is configured to disqualify the given entity responsively to assessing that the growth rate exceeds a predefined value.

13. The system according to claim 9, wherein the criterion depends on a number of the entities with which the given entity communicates in a single communication session.

14. The system according to claim 9, wherein the criterion determines that the given entity indicates false interrelationships among the entities.

15. The system according to claim 9, wherein the link processor is configured to determine that the given entity indicates both the false interrelationships and the genuine interrelationships by identifying that a growth rate of a total number of the entities that communicate with the given entity falls between predefined minimum and maximum values.

16. The system according to claim 9, wherein the link processor is configured to assign respective scores to the entities that communicate with the given entity, and to distinguish between the false interrelationships and the genuine interrelationships responsively to the scores.

* * * * *